Aug. 2, 1966  J. KRIZMAN, JR  3,263,404

SPARK ARRESTER

Filed April 1, 1963

INVENTOR.
JOHN KRIZMAN JR.

BY R. E. Geauque

ATTORNEY

United States Patent Office 3,263,404
Patented August 2, 1966

3,263,404
SPARK ARRESTER
John Krizman, Jr., 10549 Monogram Ave.,
Granada Hills, Calif.
Filed Apr. 1, 1963, Ser. No. 269,496
10 Claims. (Cl. 55—447)

This invention relates to a spark arrester and more particularly to spark arrester for small engines, such as those which propel motorcycle and other trail vehicles employed for forestry and hunting uses.

Spark arresters presently do not satisfactorily remove burning carbon particles from the exhaust of small engines, such as those having an exhaust flow of 70 c.f.m. and below, since these devices require a much higher exhaust flow to produce the necessary separating action. When the exhaust flow rate is reduced from rated flow, the efficiency of these devices rapidly decreases so that they cannot be utilized on small engines.

Standards have been established for the minimum performance and maintenance requirements of spark arresters for internal combustion engines to be used in proximity to grass, bush, timber and similar cellulose materials. Arresting efficiency has been defined as the percent of carbon particles retained or destroyed by the arrester. After a rated flow range has been determined for a spark arrester, it can be applied to any engine which has an exhaust flow rate within the rated range under operating conditions of maximum speed and power. While qualified spark arresters are available for larger engines utilized for saw mills, trucks, etc., the present invention meets the need for a qualified arrester for use on small engines utilized for trail vehicles.

The spark arrester of the present invention utilizes a pair of tubes located side by side within a larger circular shell, with the first tube of the pair connected to engine exhaust and the second tube of the pair discharging to atmosphere. The first tube contains a plurality of openings for directing the exhaust transversely through the tube into the shell. The second tube has a slot defined by a flared lip which cooperates with the inner surface of the shell to produce an increase in velocity which deposits the carbon particles in the shell prior to discharge of the exhaust gas through the slot of the second tube. With this structure, it has been determined by test that no loss in efficiency results as the exhaust flow rate is decreased below its rated flow range and that high arresting efficiency can be maintained down to very low exhaust flow rates in the neighborhood of 5–10 c.f.m. The compact construction of the invention permits easy installation on small engines propelling small vehicles.

It is therefore an object of the present invention to provide a spark arrester for small engines which have low exhaust flow rates.

Another object of the invention is to provide a spark arrester which is compact in construction so that it can be easily installed on engines for small vehicles.

A further object of the invention is to provide a spark arrester for use on small engines which propel trail vehicles, said spark arrester having no decrease in arresting efficiency as the flow rate decreases within the rated flow range and below.

These and other objects of the invention, not specifically set forth above, will become readily apparent from the accompanying description and drawings, in which.

Figure 1:
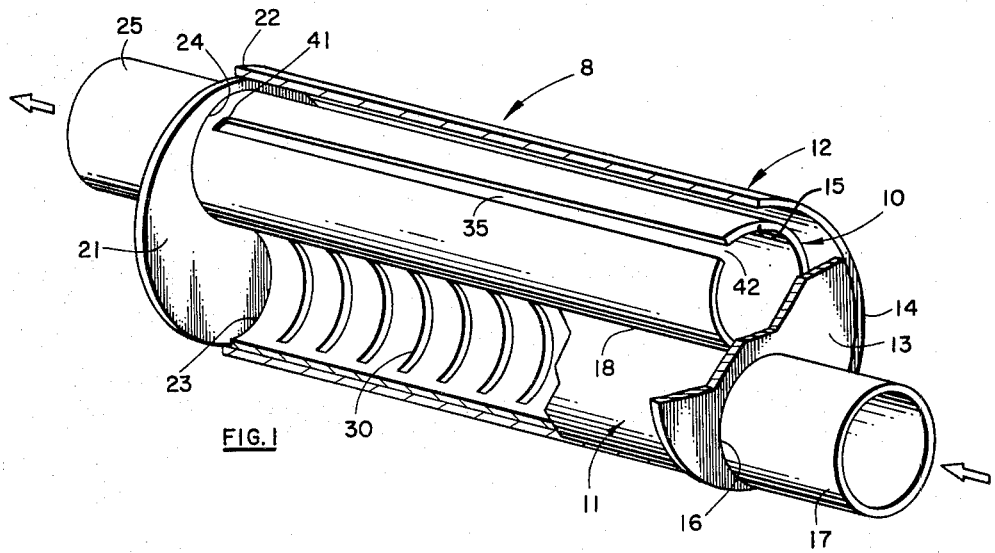
FIGURE 1 is a perspective view, partly in section, of the spark arrester of the present invention.
Figure 2:
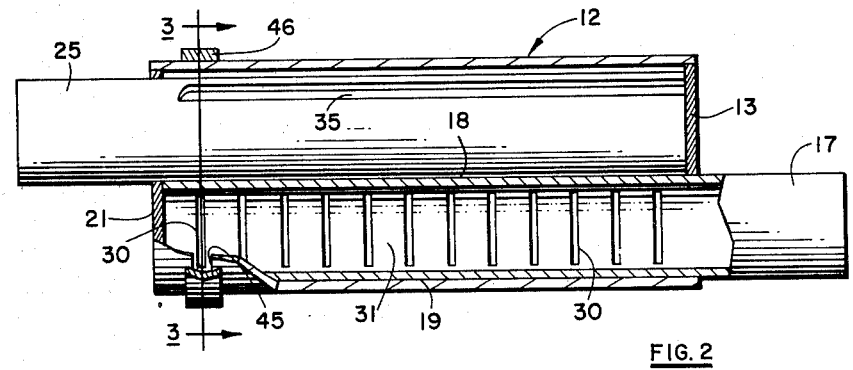
FIGURE 2 is a longitudinal sectional view, partly in elevation, showing the pair of tubes contained within the larger shell.

Referring to FIGURE 1, the spark arrester 8 of the present invention generally comprises a pair of tubes or conduits 10 and 11 located adjacent one another and having their overlapping ends confined within a larger, circular shell 12. End plate 13 closes end 14 of shell 12 and end 15 of tube 10, and contains an opening 16 through which end 17 of tube 11 extends in sealed relationship thereto. The end 17 can receive the standard exhaust pipe of a small engine and can be secured thereto by bolts or any other well known fastening means. The exterior surfaces of tubes or conduits 10 and 11 are secured together in any satisfactory manner, such as by welding, along the exterior longitudinal surface line 18 so that no substantial leakage can occur between the two tubes at this location. Also, the exterior surface of tube 11 is secured to the interior surface of shell 12 in any suitable manner, along the longitudinal line 19 to prevent any substantial leakage therebetween at this location.

End plate 21 closes the opposite end 22 of larger shell 12 and the end 23 of tube 11, and contains an opening 24 through which end 25 of tube 10 extends in sealed relationship thereto. The end 25 discharges the exhaust gas to atmosphere after the carbon particles have been removed in the manner presently to be described.

Figure 3:
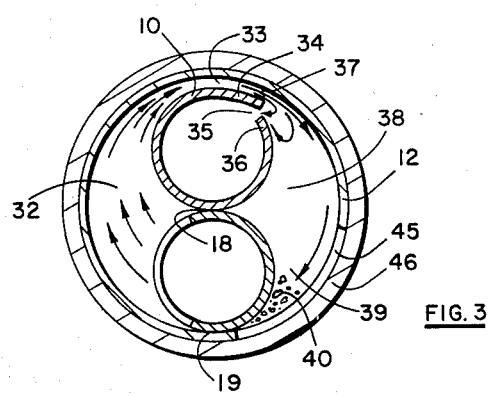
FIGURE 3 is a transverse section along line 3—3 of FIGURE 2 showing the flow openings in the first tube of the pair and the flow slot in the other tube.

Tube 11 contains a plurality of transverse openings or passage means 30 which are located between longitudinal lines 18 and 19. While the openings or passage means 30 are illustrated as rectangular in shape, other shapes can also be utilized. The openings are separated by portions 31 of the tube 11 and are preferably equally spaced longitudinally along the tube. The total flow area of the openings 30 is equal to or greater than the flow area of inlet tube 11 to prevent an excessive increase in back pressure. The exhaust gas entering end 17 of tube 11 will be discharged through openings 30 into space 32 within shell 12 and substantially uniform distribution of the exhaust gas will result in space 32 because of the substantially equal spacing between openings 30. Also, sufficient turbulence will exist within tube 11 to cause the exhaust gas to carry the carbon particles through the openings into space 32, even though there is a change in flow direction from longitudinal flow in tube 11 to circular flow in tube 12, as indicated by the arrows in FIGURE 3.

Means are provided for directing the exhaust gas from the opening or passage means 30 to discharge end 25 of tube or conduit 10 and may include a restricted space 33 which exists between the exterior surface of tube 10 and the interior surface of shell 12 and the shape of space 33 is defined by the flared edge 34 of longitudinal slot or discharge opening means 35 located in tube 10 on the side opposite to the side on which the opening or passage means 30 is located in tube or conduit 11. End 41 of slot 35 is located adjacent the end plate 21, and end 42 of the slot extends to the end plate 13. The slot or discharge opening means 35 can be formed by first placing a longitudinal slot in tube 11 and then flaring edge 34 outwardly while the other edge 36 retains its circumferential shape.

Slot 35 is placed in tube 10 at the location where its surface commences to rapidly diverge from the interior surface of shell 12 and space 33 progressively narrows to the throat 37 opposite edge 34. The throat 37 discharges to diverging space 38 between tube 10 and shell 12 which is in communication with a converging space 39 between tube 11 and shell 12.

The circular velocity of the exhaust gas and carbon particles in space 32 is increased as they are forced through restricted space 33 and throat 37 into space 38. Since the carbon particles 40 are heavier than the exhaust gas, centrifugal force causes them to follow around the interior surface of the shell 12 and drop out into the carbon trap defined by the lower, converging end portion of space 39. The exhaust gas in spaces 38, 39 reverses flow direction and flows through longitudinal slot 35 into outlet tube 10 and then to atmosphere because of the differential pressure between spaces 38, 39 and the outlet end 25 of tube 10. Slot 35 will have a total flow area as large as openings 30 and larger than that of inlet tube 11.

The carbon particles are retained in the carbon trap by gravity. In order to remove the collected carbon particles 40 after a period of engine operation, a clean-out opening 45 in the form of a slot is located in shell 12 adjacent end 22 and opposite the space 39. The slot 45 is normally covered during engine operation by a band 46 extending completely around shell 12 and tightened thereagainst. When it is desired to remove the carbon particles, the band 46 is removed and the engine is operated so that the exhaust pressure blows the particles through opening 45 into the atmosphere, thereby removing the particles from the carbon trap.

The subject invention provides a novel and compact device for removal of carbon exhaust particles which are capable of starting fires if discharged into the atmosphere. It is understood that the dimensions of the spark arrester, including the width of throat 37 and the sizes of the tubes and shell, are matched to the exhaust flow conditions so that the gas discharge from throat 37 is fast enough to separate the carbon particles without creating excessive turbulence which might cause the gas to again pick up the particles and carry them through slot 35.

The rectangular slots 30 can be replaced by openings of other shapes or could be replaced by a single slot extending longitudinally along the tube 11. Also, the position of tube 10 can be reversed so that end 25 discharges in the opposite direction to provide for full reversal of exhaust gas flow within the spark arrester. In assembling the device, the tubes 10 and 11 can first be secured together and then inserted in the shell 12 and thereafter the end plates 13 and 21 fixed in position to close the opposite ends of the shell 12. While it is preferable to assemble the components of the invention by welding the parts together, it is understood that other types of fabrication can be utilized. Various other modifications are contemplated by those skilled in the art without departing from the spirit and scope of the invention as hereinafter defined by the appended claims.

What is claimed is:

1. A spark arrester comprising: an elongated shell having end closure walls; first and second conduits having overlapping ends enclosed within said shell, the other end of said first conduit adapted to be in communication with the exhaust of an internal combustion engine and the other end of said second conduit adapted to be in communication with the atmosphere; said overlapping end of said first conduit being in longitudinally abutting and closed relationship with a portion of the interior surface of said shell and one of said end closure walls and the overlapping end of said second conduit; the overlapping end of said second conduit being in longitudinally abutting and closed relationship with the other of said end closure walls; passage means in one side of said overlapping end of said first conduit to permit said engine exhaust to be conducted away from and in a direction transverse to said first conduit; discharge opening means in said second conduit on the side opposite to the side on which said passage means is located; means for directing the exhaust from said passage means to said discharge opening means including a flow passage having a throat portion upstream of said discharge opening means for increasing the velocity of the exhaust in said flow passage to separate carbon particles from said engine exhaust prior to entering said discharge opening means for discharge through said second conduit; and carbon trap means located downstream and below said discharge opening means, said trap means including a converging space defined by the downstream lower exterior surface of said first conduit and the downstream lower interior surface of said shell.

2. A spark arrester as defined in claim 1 wherein said passage means comprises a plurality of transverse slots in said one side of said first conduit substantially evenly spaced along the overlapping end of said first conduit to uniformly distribute the exhaust gas to said discharge opening means.

3. A spark arrester as defined in claim 1 wherein said discharge opening means comprises a longitudinal slot adjacent said flow passage.

4. A spark arrester as defined in claim 1 wherein the interior of said shell is divided by said conduits into a first space located between said passage means and said flow passage and a second space receiving the discharge from said throat, the carbon particles separated from the exhaust gas being carried to the lower portion of said second space by centrifugal force; said first space being defined by the upstream exterior surfaces of said first and second conduits and the upstream interior surface of said shell; said second space being defined by the downstream exterior surfaces of said first and second conduits and the downstream interior surface of said shell.

5. A spark arrester as defined in claim 4 having a clean-out opening in the downstream portion of said shell opposite said carbon trap and exterior surface of said second conduit, closure means for normally closing said opening during operation and for uncovering said opening during engine operation to allow the carbon particles collected in said second space to blow out.

6. A spark arrester comprising: an elongated shell having end closure walls; first and second conduits having overlapping ends enclosed within said shell, the other end of said first conduit adapted to be in communication with the exhaust of an internal combustion engine and the other end of said second conduit adapted to be in communication with the atmosphere; said overlapping end of said first conduit being in longitudinally abutting and closed relationship with a portion of the interior surface of said shell and one of said end closure walls and the overlapping end of said second circuit; the overlapping end of said second conduit being in longitudinally abutting and closed relationship with the other of said end closure walls; passage means in one side of said overlapping end of said first conduit to permit said engine exhaust to be conducted away from and in a direction transverse to said first conduit; a longitudinal slot in said second conduit on the side opposite to the side on which said passage means is located; means for directing the exhaust from said passage means to said slot including a flow passage having a throat portion; said slot being adjacent said flow passage and being defined by an edge flared outwardly in said flow passage to produce said throat portion therein, said exhaust gas and carbon particles therein flowing from said passage means through said flow passage and being accelerated by flow through said throat portion to discharge carbon particles within said shell while the exhaust gases leave said shell through said slot.

7. A spark arrester as defined in claim 6 wherein said passage means comprises a plurality of transverse slots in said one side of said first conduit substantially spaced along the overlapping end of said first conduit to uniformly distribute the exhaust gas to said discharge opening means.

8. A spark arrester as defined in claim 6 wherein both said conduits are of circular cross-section and said shell is a larger, cylindrical tube having end closures through which extend the other end of said conduits.

9. A spark arrester comprising: an elongated shell having end closure walls;
first and second conduits having overlapping ends enclosed within said shell, the other end of said first conduit adapted to be in communication with the exhaust of an internal combustion engine and the other end of said second conduit adapted to be in communication with the atmosphere; said overlapping end of said first conduit being in longitudinally abutting and closed relationship with a portion of the interior surface of said shell and one of said end closure walls and the overlapping end of said second conduit; the overlapping end of said second conduit being in longitudinally abutting and closed relationship with the other of said end closure walls;
passage means in one side of said overlapping end of said first conduit;
discharge opening means in said second conduit on the side opposite to the side on which said passage means is located; and
the overlapping end of said second conduit being spaced from the interior surface of said shell to provide a flow passage for exhaust gases from said passage means to said discharge opening means.

10. A spark arrester as defined in claim 9 comprising:
a trap means including a converging space defined by the downstream lower exterior surface of said first conduit and the downstream lower interior surface of said shell.

References Cited by the Examiner

UNITED STATES PATENTS

| | | | |
|---|---|---|---|
| Re. 25,384 | 5/1963 | Bryant | 181—53 X |
| 1,494,387 | 5/1924 | Spuhr | 55—345 |
| 2,147,015 | 2/1939 | Beremer | 181—53 |
| 2,196,491 | 4/1940 | Chipley | 55—447 X |
| 2,511,190 | 6/1950 | Wright | 55—447 |
| 2,614,647 | 10/1952 | Bryant | 181—57 |
| 2,928,492 | 3/1960 | Nelson | 181—47 |
| 3,109,510 | 11/1963 | Phelan | 181—53 |

HARRY B. THORNTON, *Primary Examiner.*

L. H. McCARTER, *Assistant Examiner.*